(12) United States Patent
La Piccirella et al.

(10) Patent No.: US 10,696,807 B2
(45) Date of Patent: Jun. 30, 2020

(54) EXPANDABLE VINYL AROMATIC POLYMERIC COMPOSITIONS

(71) Applicant: Versalis S.p. A., San Donato Milanese (IT)

(72) Inventors: Andrea La Piccirella, Mantova (IT); Aldo Longo, Mantova (IT); Dino Ferri, Valeggio sul Mincio (IT); Giuditta Vannucci, Castelfranco di Sotto (IT)

(73) Assignee: Versalis S.p.A., San Donato Milanese (IT)

(*) Notice: Subject to any disclaimer, the term of this patent is extended or adjusted under 35 U.S.C. 154(b) by 528 days.

(21) Appl. No.: 15/010,320

(22) Filed: Jan. 29, 2016

(65) Prior Publication Data

US 2016/0222181 A1    Aug. 4, 2016

(30) Foreign Application Priority Data

Jan. 30, 2015   (IT) .............................. MI2015A0122

(51) Int. Cl.
| | | |
|---|---|---|
| *C08J 9/16* | (2006.01) | |
| *C08J 9/00* | (2006.01) | |
| *C08J 9/14* | (2006.01) | |
| *C08J 9/224* | (2006.01) | |
| *C08J 9/18* | (2006.01) | |
| *C08L 25/04* | (2006.01) | |
| *C08L 25/14* | (2006.01) | |

(52) U.S. Cl.
CPC ........... *C08J 9/0061* (2013.01); *C08J 9/0004* (2013.01); *C08J 9/0014* (2013.01); *C08J 9/141* (2013.01); *C08J 9/16* (2013.01); *C08J 9/18* (2013.01); *C08J 9/224* (2013.01); *C08L 25/04* (2013.01); *C08L 25/14* (2013.01); *C08J 2201/03* (2013.01); *C08J 2201/036* (2013.01); *C08J 2203/14* (2013.01); *C08J 2203/182* (2013.01); *C08J 2325/06* (2013.01); *C08J 2325/14* (2013.01); *C08J 2425/06* (2013.01); *C08J 2425/14* (2013.01)

(58) Field of Classification Search
CPC .............................................. C08J 2325/04–16
See application file for complete search history.

(56) References Cited

U.S. PATENT DOCUMENTS

| | | | | |
|---|---|---|---|---|
| 5,110,837 | A * | 5/1992 | Harclerode | ............... C08J 9/228 |
| | | | | 264/53 |
| 5,240,657 | A | 8/1993 | Harclerode et al. | |
| 6,187,831 | B1 * | 2/2001 | Miller | ...................... C08J 9/122 |
| | | | | 521/146 |
| 10,000,594 | B2 * | 6/2018 | Hlavinka | ............... C08F 210/16 |
| 2007/0066693 | A1 | 3/2007 | Bres et al. | |

FOREIGN PATENT DOCUMENTS

| | | | | |
|---|---|---|---|---|
| EP | 0485226 A1 * | 5/1992 | ................ | C08J 9/16 |
| JP | 11-80410 | 3/1999 | | |
| JP | 2005-281475 | 10/2005 | | |
| WO | WO 94/10232 | 5/1994 | | |
| WO | WO-2009009252 A1 * | 1/2009 | ............ | C08J 9/0023 |
| WO | WO 2012/109505 | 8/2012 | | |

OTHER PUBLICATIONS

Machine translation of JP 2005-281475 by Hayashi (Year: 2005).*
Machine translation of JP 2000248104 by Ohara (Year: 2000).*
Translation of Table 1 from JP 2005-281475 by Hayashi (Year: 2005).*
JP 11-302427 by Gokuraku et al. (Year: 1991).*
"Liquid Paraffin Safety Data Sheet" by Vet Way Limited, dated 2003. (Year: 2003).*
Italian Search Report dated Jul. 15, 2015 in Italian Application MI2015 0122, filed on Jan. 30, 2015 ( with English Translation of Categories of Cited Documents).
Database WPI, Thomson Scientific, XP002742246, 1999, 1 page.
Examination Report as received in the corresponding IN Application No. 201644002659 dated Dec. 12, 2019.
Decision to Grant a Patent for an Invention as received in corresponding Russian Patent Application No. 2016101768/05 dated Feb. 22, 2019 w/English Translation.
Notice of Opposition issued in European Patent Application No. EP 3 956 534 dated Jan. 8, 2020.
Examination Report issued in the corresponding Brazilian patent application BR 102015001915-0 dated Feb. 11, 2020, and published on Feb. 18, 2020 on the Brazilian Official Gazette (along with its English translation).
http://www.putus.org/news/2009/0121/13.shtm (consulted Nov. 2019) Jan. 21, 2009.
Rodolfo Pinal, "Entropy of Mixing and the Glass Transition of Amorphous Mixtures", *Entropy*, 2008, 10, 207-223, (Aug. 26, 2008), XP055664692 DOI: http://dx.doi.org/10 3390/entropy-e10030207.

(Continued)

*Primary Examiner* — Randy P Gulakowski
*Assistant Examiner* — Christina H. W. Rosebach
(74) *Attorney, Agent, or Firm* — Oblon, McClelland, Maier & Neustadt, L.L.P.

(57) ABSTRACT

The application relates to an expandable polymeric composition with an enhanced processability, which comprises a polymeric base, an expanding agent, and an additive with a plasticizing effect; said polymeric composition being characterized in that:

the molecular mass at the maximum peak Mp of (i) ranges from 130 kDa to 190 kDa and the centrifugal average molecular mass Mz of (i) ranges from 430 kDa to 900 kDa, the difference in the glass-transition temperature (DTg) measured between a vinyl aromatic polymer having a molecular weight distribution (MWD) of (i) and composition of the vinyl aromatic fraction alone of (i), and a polymeric composition consisting of (i) and (iii), ranges from 1° C. to 8° C.

14 Claims, No Drawings

(56) References Cited

OTHER PUBLICATIONS

Karen E. Haneke, Tetrabromobisphenol A bis(2,3-dibromopropyl ether) [21850-44-2]—Review of Toxicological Literature, Toxicological Summary for Tetrabromobisphenol A bis(2,3-dibromopropylether), 20021101 National Institute of Environmental Health Sciences URL:http://ntp.niehs.nih.gov/ntp/htdocs/ChemBackor ound/ExSumPdf/TBBPA-BDPE.pdf.
Edward D. Weil et al., "Flame Retardants for Plastics and Textiles", *Flame Retardants for Plastics and Textiles*, (20090000), pp. 1-359 (2009).
Jaya Maitra, et al. "Cross-linking in Hydrogels—A Review," *American Journal of Polymer Science*, 2014; 4(2) XP055332854 DOI: http://dx.doi.org/10.5923/j.ajps.20140402.01.

\* cited by examiner

EXPANDABLE VINYL AROMATIC POLYMERIC COMPOSITIONS

The present invention relates to an expandable polymeric composition with an enhanced processability, i.e. with a high expansion rate and an excellent stability of the cell structure and final end-product.

In the present patent application, all the operating conditions indicated in the text should be considered as being preferred conditions, even if not expressly declared.

For the purposes of the present document, the term "comprises" or "includes" also comprises the term "consisting in" or "essentially consisting of".

For the purposes of the present document, the definitions of the ranges always include the extremes, unless otherwise specified.

The expanded end-products based on expandable vinyl aromatic polymeric compositions are generally produced by means of an expansion process, traditionally effected by heating the same composition, in the form of spheroidal beads (the beads generally having a diameter ranging from about 0.5 mm to about 1.5 mm), with steam. The heating takes place at a higher temperature than the softening temperature of the vinyl aromatic polymeric composition, also known as glass transition temperature ($T_g$).

The $T_g$ of a polymeric material is defined as the temperature at which the second order transition takes place between the solid state and the liquid state of a polymeric composition, as described, for example, in "Principles and applications of Thermal Analysis" of Paul Gabbott, Blackwell Publishing Ltd. 2008.

Expandable vinyl aromatic compositions are mainly used in the production of packaging and insulating panels.

The production process of expanded end-products comprises various phases. In a first phase, called pre-expansion, the vinyl aromatic composition in the form of beads, containing an expandable substance, is heated with steam, and the beads increase their volume forming larger spheres, passing from an original compact structure to a final cell structure. In this phase, the density of the beads of the vinyl aromatic composition decreases from about 1,000 kg/m$^3$ to about 10-30 kg/m$^3$. The pre-expansion phase can be effected in one or more subsequent steps. The pre-expansion phase is followed by the moulding phase of the end-product, in which the pre-expanded beads having a low density, are heated and compressed in a mould where they are sintered, binding together and occupying the volume available. After cooling, an end-product is obtained, composed of the expanded original spheres having a cell structure and sintered together so as to form a unique solid product.

The behaviour of the vinyl aromatic composition during pre-expansion represents one of the key factors for the productivity of expanded end-products as reaching low densities in a single rapid expansion step, allows high productions and a saving of material and energy. The typical pre-expansion time period in the industrial production of expanded end-products ranges from 0.5 minutes to 3 minutes and therefore the optimal density, within the range of 10 kg/m$^3$ to 30 kg/m$^3$, must be reached in short periods of time.

At the same time, a good behaviour of the material must be guaranteed, also with long contact times with the steam during the moulding phase, without the collapse of the cell structure and maintaining a good stability of the form of the final end-product.

For the purposes of the present document, the capacity of the material of rapidly lowering its density is defined as "expansion rate" or "expandability".

For the purposes of the present document, the general behaviour of the expandable vinyl aromatic composition in terms of expansion rate and collapse resistance is defined as "processability" of the material and can be described by means of "expansion curves", obtained by measuring the density of the beads of expandable vinyl aromatic composition subjected to contact with steam, at different times or "expansion times".

It is known that the expansion rate of expandable vinyl aromatic compositions can be increased by using plasticizers or acrylic copolymers, which reduce the viscosity of the expandable vinyl aromatic composition decreasing its softening temperature or $T_g$. The reduction in viscosity thus obtained, however, causes a premature collapse of the cell structure during the expansion process, making it difficult to reach the required final low density and in general offering a worse processability of the material during the subsequent moulding process.

Patent EP485226 teaches that high expansion rates can be obtained using styrene copolymers and n-butyl acrylate in quantities ranging from 0.1 to 30% by weight, or mixing said copolymer with polystyrene having the same average molecular weight. According to EP 485226, these copolymers reach densities lower than 4 kg/m$^3$ with respect to polystyrene alone (9 kg/m$^3$ against 13 kg/e), with expansion times of 2 minutes, it also teaches however that with expansion times of 5 minutes, the copolymer collapses, whereas the reference polystyrene continues to expand.

U.S. Pat. No. 4,520,135 describes a polystyrene having an improved expandability with a specific molecular weight distribution (indicated in the present text as MWD molecular weight distribution). This patent teaches that by controlling the molecular weight distribution of the polymer, effected by the dosage of a chain-transfer agent during the synthesis process in suspension of polystyrene, the expandability of the polystyrene can be improved. In particular, the weight average molecular weight (also indicated in the present text as average molecular mass by weight and as Mw) of the polystyrene ranges from 130,000 to 180,000 Da.

Low molecular weights allow high expansion rates to be reached, but also cause the collapse of the cell structure and therefore instability of the expansion product.

By maintaining the Mw within the range of 130 kDa to 180 kDa, with a low polydispersity index, defined as Mw/Mn ratio, wherein Mn is the number average molecular weight, and avoiding the presence of high-molecular-weight fractions, a good processability of expandable polystyrene is obtained.

U.S. Pat. Nos. 5,112,875 and 5,240,657 also describe that expandable polystyrene with an improved expandability can be obtained by controlling the molecular weight distribution of the same polystyrene.

In particular, U.S. Pat. No. 5,112,875 describes an expandable polystyrene in which the molecular weight distribution is controlled with the use of a chain-transfer agent during the synthesis process. U.S. Pat. No. 5,112,875 teaches that expandable polystyrene has a weight average molecular weight ranging from 180 kDa to 300 kDa with a polydispersity index ranging from 2 to 2.5. This patent teaches how to obtain expandable polystyrene with a density ranging from 13 kg/m$^3$ to 18 kg/m$^3$ and with a low content of pentane as expanding agent, by means of a pre-expansion process that must be carried out in two or more steps.

U.S. Pat. No. 5,118,718 describes expandable polystyrene with an enhanced expandability obtained by introducing, into the suspension synthesis, a di-vinyl monomer as generator of a branched structure of the polymer, controlling the molecular weight distribution with a chain-transfer agent, such as a dimer of α-methyl-styrene, so as to avoid the formation of fractions having a high molecular weight. Good densities are obtained in the examples (from 10 kg/m³ to 12 kg/m³) with low contents (4%) of pentane as expanding agent, but the expansion times range from 10 to 12 minutes.

U.S. Pat. No. 5,591,778 describes a process for the preparation of expandable polystyrene with an enhanced expandability obtained by using an auxiliary expanding agent. This expanding agent consists of a saturated hydrocarbon with a boiling point range of 70° C. to 170° C. The densities obtained in the examples range from 20-21 kg/m³ and the expansion times are 10 minutes.

Patent application US 2004/249003 describes a process for the production of EPS granules, in which mineral oil is used in the expandable polystyrene without the use of a chain-transfer agent, in order to obtain high molecular weights and avoid the collapse of the cell structure in the expansion process.

Patent application US 2007/0066693 describes expandable polystyrene in the form of granules, in which mineral oil is present. The expandable polystyrene has a weight average molecular weight ranging from 150 kDa to 300 kDa with a polydispersity index ranging from 1.8 to 2.6. With this polystyrene, stable end-products having good mechanical properties are obtained, but the density ranges from 40 to 190 kg/m³.

In short, the state of the art indicates that the processability of expandable vinyl aromatic compositions is critical due to the difficulty in contemporaneously obtaining high expansion rates and a good stability of the cell structure. A significant increase in the expandability, in fact, leads to a premature collapse of the cell structure of the polymeric material and yet the guarantee of a good stability of the cell structure requires lengthy pre-expansion times.

The Applicant has surprisingly found that by decreasing the glass transition temperature (Tg) of a polymeric composition and contemporaneously controlling the molecular weight distribution of the polymeric component in the same composition, with a high molecular weight polydispersity index (Mw/Mn) obtained by introducing a fraction of polymer with a high molecular weight, a polymeric composition with high pre-expansion rates and with an excellent stability of its cell structure, can be obtained.

An object of the present invention therefore relates to an expandable polymeric composition with an enhanced processability comprising:

i. a polymeric base comprising:
  a) from 0% to 100% by weight measured on the total base (i) of a vinyl aromatic polymer,
  b) from 100% to 0% by weight measured on the total base (i) of a co-polymer containing from 50% to 99% by weight of vinyl aromatic monomers and from 1% to 50% of at least one type of alkyl ester having from 1 to 18 carbon atoms, derivative of acrylic or methacrylic acid,
ii. from 0.2 to 10 parts by weight measured on 100 parts of polymeric base (i) of an expanding agent, and
iii. alternatively:
  A) from 0 to 10 parts by weight measured on 100 parts of polymeric base (i) of an additive with a plasticizing effect when (i) comprises at least 2% by weight of (b), or
  B) from 0.3 to 10 parts by weight measured on 100 parts of polymeric base (i) of an additive with a plasticizing effect when (i) comprises only (a), said polymeric composition being characterized in that:
  the molecular weight at the maximum peak (indicated in the present text as Mp) of (i) ranges from 130 kDa to 190 kDa and the centrifugal average molecular weight (indicated in the present text as Mz) of (i) ranges from 430 kDa to 900 kDa,
  the difference in the glass-transition temperature (DTg) measured between a vinyl aromatic polymer having a molecular weight distribution (MWD) of (i) and composition of the vinyl aromatic fraction alone of (i) (which in the present patent application is also indicated as "reference vinyl aromatic polymer"), and a polymeric composition consisting of (i) and (iii), ranges from 1° C. to 8° C.

The expandable polymeric composition, object of the present patent application, allows densities lower than 20 kg/m³ to be obtained in 1 minute, and a stability of the cell structure up to over 5 minutes with 5% of pentane as expanding agent already in the pre-expansion phase, maintaining the stability of the cell structure (avoiding its collapse) also in the subsequent moulding or second expansion phase.

Lowering the temperature Tg allows the pre-expansion rate to be increased, a wide molecular weight distribution implies stability of the final cell structure.

The best balance of velocity in the pre-expansion, stability of the cell structure, and stability of the end-product at the end of the moulding process, advantageously increases the productivity, decreases, or in any case does not increase, the content of expanding agent necessary for obtaining the expanded end-products in an economically convenient time, with a consequent reduction in emissions of volatile organic substances into the atmosphere.

DETAILED DESCRIPTION

All the essential aspects of the present invention and its preferred embodiments are described hereunder in detail.

The present invention relates to an expandable polymeric composition with an enhanced processability comprising:

i. a polymeric base comprising:
  a) from 0% to 100% by weight measured on the total base (i) of a vinyl aromatic polymer,
  b) from 100% to 0% by weight measured on the total base (i) of a co-polymer containing from 50% to 99% by weight of vinyl aromatic monomers and from 1% to 50% of at least one type of alkyl ester having from 1 to 18 carbon atoms, derivative of acrylic or methacrylic acid,
ii. from 0.2 to 10 parts by weight measured on 100 parts of polymeric base (i) of an expanding agent, and
iii. alternatively:
  A) from 0 to 10 parts by weight measured on 100 parts of polymeric base (i) of an additive with a plasticizing effect when (i) comprises at least 2% by weight of (b), or
  B) from 0.3 to 10 parts by weight measured on 100 parts of polymeric base (i) of an additive with a plasticizing effect when (i) comprises only (a), said polymeric composition being characterized in that:
  the molecular mass at the maximum peak (indicated in the present text as Mp) of (i) ranges from 130 kDa to 190 kDa and the centrifugal average molecular weight (indicated in the present text as Mz) of (i) ranges from 430 kDa to 900 kDa,
  the difference in the glass-transition temperature (DTg) measured between a vinyl aromatic polymer having a molecular weight distribution (MWD) of (i) and composition of the vinyl aromatic fraction alone of (i) (which in the present patent application is also indicated as "reference vinyl aromatic polymer"), and a polymeric composition consisting of (i) and (iii), ranges from 1° C. to 8° C.

The compositions described and claimed in the present patent application are preferably characterized by the Mp of the component (i) ranging from 130 kDa to 180 kDa, more preferably from 140 kDa to 190 kDa, even more preferably from 140 kDa to 180 kDa.

The compositions described and claimed in the present patent application are preferably characterized by the Mz of the component (i) ranging from 430 kDa to 800 kDa, more preferably from 440 kDa to 900 kDa, even more preferably from 440 kDa to 700 kDa.

The centrifugal average molecular weight (Mz) of (i) preferably increases within the range of 430 kDa to 900 kDa with an increase in the DTg of the polymeric composition consisting of (i) and (iii) ranging from 1° C. to 8° C.

The compositions described and claimed in the present patent application are preferably characterized by a DTg ranging from 3° C. to 8° C.

A particular embodiment of the compositions described and claimed in the present patent application, is a composition in which the polymeric base (i) comprises a vinyl aromatic copolymer (b) containing from 1% to 6% of at least one type of alkyl ester having from 1 to 18 carbon atoms and which derives from acrylic or methacrylic acid, and containing from 94% to 99% of vinyl aromatic monomers.

A further particular embodiment of the compositions described and claimed in the present patent application, is a composition in which the polymeric base (i) can contain:
a) from 80% to 98% by weight measured on the total base (i) of a vinyl aromatic polymer,
b) from 20% to 2% by weight measured on the total base (i) of a co-polymer containing from 50% to 70% by weight of vinyl aromatic monomers and from 30% to 50% by weight of at least one type of alkyl ester having from 1 to 18 carbon atoms, derivative of acrylic or methacrylic acid.

These particular forms can have a polymeric base (i) containing the acrylic comonomer when only component (b) is present, or also when both components (a) and (b) are present. When only (b) is present, the quantity of acrylic comonomer cannot be higher than 6% as there would be a DTg higher than 8° C., therefore, in this case, the quantity of (b) preferably ranges from 1 to 6% by weight.

A further particular embodiment of the compositions described and claimed in the present patent application, is a composition in which the polymeric base (i) can contain:
a) 96% by weight measured on the total base (i) of a vinyl aromatic polymer,
b) 4% by weight measured on the total base (i) of a co-polymer containing 50% by weight of vinyl aromatic monomers and 50% by weight of at least one type of alkyl ester having from 1 to 18 carbon atoms, derivative of acrylic or methacrylic acid.

In a preferred embodiment, the composition described and claimed comprises the characteristics (i)-(iii) as described and claimed in the present text, and is characterized in that:
the molecular weight at the maximum peak (Mp) of (i) ranges from 140 kDa to 190 kDa and the centrifugal average molecular weight (Mz) of (i) ranges from 430 kDa to 800 kDa, more preferably from 440 kDa to 900 kDa, even more preferably from 440 kDa to 700 kDa;
the difference in the glass-transition temperature (DTg) measured between the glass transition temperature (Tg) of a vinyl aromatic polymer having a molecular weight distribution of (i) and composition of the vinyl aromatic fraction alone of (i), and the glass transition temperature (Tg) of a polymeric composition consisting of (i) and (iii), ranges from 1° C. to 8° C., more preferably from 3° C. to 8° C.

The molecular weight distribution of the polymeric base (i) combined with a DTg (calculated between a vinyl aromatic polymer having a MWD of (i) and composition of the vinyl aromatic fraction alone of (i), and a polymeric composition consisting of (i) and (iii)), have a fundamental role in the behaviour of the whole expandable composition object of the present invention during the expansion process.

The molecular weight distribution can be determined by size exclusion chromatography or gel-permeation chromatography (GPC) as described in U.S. Pat. No. 4,520,135 or by Sadao Mori, Howard G. Barth "Size Exclusion Chromatography" Springer Verlag Berlin Heidelberg 1999. The molecular weight distribution (MWD) can be described with the average molecular weights of the distribution: number average (Mn), weight average (Mw), centrifugal average (Mz), together with the molecular weight value that has the maximum concentration in the polymeric composition or molecular weight at the maximum peak (Mp) of the chromatogram provided by GPC.

The DTg of the composition described and claimed in the present patent application is determined by measuring the Tg values without including the expanding agent (ii). The expanding agent, in fact, considerably lowers the Tg, but evaporates during the expansion process.

As there is no transition between two thermodynamic phases in equilibrium, the Tg depends on the method with which it is determined. The difference in DTg between two polymeric compositions measured with the same instrument and the same method, however, is considered as being a reference value for the purposes of the present invention. Methods which are known and widely used for the experimental determination of the Tg or softening point correlated with it for amorphous polymeric compositions are Differential Scanning calorimetry (DSC), dynamic-mechanical analysis (DMA) and the methods according to VICAT defined in the international standards ISO 306.

The difference in the glass transition temperature (DTg) is calculated by considering the difference between the Tg of a vinyl aromatic polymer having a MWD of (i) and composition of the vinyl aromatic fraction alone of (i), and the Tg of a polymeric composition consisting of (i) and (iii).

The difference in the glass transition temperature (DTg) can range from 1° C. to 8° C., preferably from 3° C. to 8° C. The Applicant has observed that a DTg higher than 8° C. can make the composition, and consequently the end-products containing said composition, non-processable and/or unsuitable for applications in locations where the end-products must resist temperatures produced by exposure to the sun at low latitudes and/or in the summer season. The Applicant has also observed that DTgs lower than 1° C. do not offer significant advantages.

The Tg of a polymeric composition depends on the chemical structure of the units forming the polymeric chains, their molecular weight distribution and the quantity of substances having a low molecular weight soluble in the polymeric base. The presence of substances completely insoluble in the polymeric composition, on the other hand, does not modify its Tg. Polymeric compositions consisting of multiple polymeric bases with a different chemical structure, which, in most cases, are incompatible with each other, have distinct Tg values which, in the case of complete incompatibility, correspond to the Tg values of the single constituent polymers. The polymeric compositions, object of the present invention, have a vinyl aromatic base and even when this is composed of two polymers, it has a single Tg. The Tg of a vinyl aromatic homopolymer also depends on the molecular weight distribution and presence of polymeric chains with a molecular weight lower than 100 kDa approximately. Polystyrene, for example, with a Mw ranging from 120 to 280 kDa with a content of oligomers, residual monomer and impurities ranging from 0.2% to 0.8% by weight, has a Tg approximately within the range of 100° C. to 106° C. (measured via DSC with a scanning rate of 20° C./min). The Tg measurement itself has an error which is such that repeated Tg measurements of the same sample of material show variations ranging from 0.5° C. to 0.8° C. The expansion process, which is normally carried out with water steam at about 100° C., takes place at temperatures very close to the Tg of the expandable polymeric composition and therefore the expansion rate is very much influenced by this. Given a certain vinyl aromatic polymer having a molecular weight distribution and content of oligomers which is such as to have a certain Tg, a reduction in the Tg can be obtained by modifying the composition of the polymer, substituting part of the vinyl aromatic units with units of esters of acrylic and/or methacrylic acid or adding a plasticizing substance or with a combination of these variations. As the Tg of a vinyl aromatic polymer can vary within a range of a few degrees centigrade on the basis of its molecular weight distribution and the presence of oligomers, residual monomer and soluble impurities, reference is made in the present invention to DTg and not to an absolute Tg. The polymeric base (i) can consist of (a) alone, (b) alone or a mixture of these. Whatever the chemical composition of (i) may be, it is always possible to determine its molecular weight distribution, synthesize a vinyl aromatic polymer that reproduces it and measure its Tg. The vinyl aromatic polymer with the molecular weight distribution of (i) can be produced with a single synthesis or by mixing various vinyl aromatic polymers, thus obtaining the sum of the molecular weight distributions of the components. The Tg of the polymeric composition consisting of (i)+(iii) is decreased with respect to the vinyl aromatic polymer with the same molecular weight distribution of (i) with the copolymer (b) and/or with the plasticizer (iii). The polymeric base (i) obtained by copolymerization of styrene and esters of acrylic acid, for example, has a Tg that decreases by about 1.7° C. for each weight percent of n-butylacrylate and about 2.2° C. for each weight percent of 2-ethylhexylacrylate. The Tg of a composition (i)+(iii) decreases by about 2° C. for each weight percent of paraffinic oil Marcol 82 (ExxonMobil).

The copolymers (b) always have a Tg lower than that of the polymer (a) so as to increase the fluidity of (i) and increase the expansion rate of the polymeric composition.

The copolymers (b) and the vinyl aromatic polymer (a) can be totally or partially obtained by copolymerization with monomers having more than one polymerizable double bond as branching agent.

The vinyl aromatic monomers that can be used in the present invention have general formula (I):

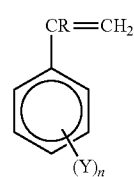

wherein R is a hydrogen or methyl group, n is zero or an integer ranging from 1 to 3, Y is a halogen selected from chlorine or bromine, or Y is a chloromethyl or an alkyl group or an alkoxyl group having from 1 to 3 carbon atoms.

Preferred vinyl aromatic monomers having formula (I) are selected from: styrene, α-methyl-styrene, isomers of vinyltoluene, isomers of ethylstyrene, isomers of propylstyrene, isomers of chlorostyrene, isomers of methylchlorostyrene, isomers of methoxystyrene, isomers of acetoxystyrene, isomers of hydroxystyrene, isomers of methylhydroxystyrene and mixtures thereof. More preferably said vinyl aromatic monomers can be selected from styrene and α-methylstyrene.

Acrylic monomers of the copolymer (b) are acrylic esters having from 1 to 18 carbon atoms derivatives of acrylic and methacrylic acid and mixtures of the same. Preferred acrylic monomers are ethyl acrylate, methyl methacrylate, butyl acrylate, 2-ethylhexyl acrylate, dodecyl acrylate, dodecyl methacrylate, stearyl acrylate, stearyl methacrylate, glycidyl methacrylate, or mixtures thereof.

Said copolymers can be obtained by radical copolymerization according to laws widely known and described, as described, for example, in George E. Ham, Copolymerization, Interscience Publisher, 1964.

The copolymers (b) are preferably selected from copolymers styrene-ethyl acrylate, styrene-methyl methacrylate, styrene-butyl acrylate, styrene-2-ethylhexyl acrylate, styrene dodecyl acrylate, styrene dodecyl methacrylate, styrene-stearyl acrylate, styrene-stearyl methacrylate, styrene-glycidyl methacrylate, or mixtures thereof.

An additive with a plasticizing effect refers to any polymeric or non-polymeric substance or a mixture of these, that is capable of lowering the Tg of a polymeric composition. Preferred plasticizing agents are selected from linear and cyclic oligomers obtained by polymerization of vinyl aromatic monomers; or saturated hydrocarbons; or mixtures of paraffins with a boiling point higher than 70° C.; or halogenated flame-retardant additives possibly containing phosphorus, sulfur or mixtures thereof.

Preferred flame-retardant agents with a plasticizing effect are selected from hexabromocyclododecane, pentabromomonochlorocyclohexane, pentabromophenylallyl ether, brominated styrene-butadiene copolymers, tetrabromobisphenol A bis-dibromopropyl ether, triphenyl phostate.

The plasticizing additive does not necessarily have to be always present, but is certainly present when the copolymer (b) is absent.

When the polymeric base (i) comprises at least 2% by weight of (b), in fact, the plasticizing additive is present in a quantity ranging from 0 to 10 parts by weight calculated with respect to 100 parts of polymeric base (i). In this case, therefore, the plasticizing additive can be optional.

When the copolymer (b) is absent (0% by weight of (b) and 100% by weight of (a)), then the plasticizing additive is present in a quantity ranging from 0.3 to 10 parts by weight calculated with respect to 100 parts of polymeric base (i).

The expansion rate of the expandable composition, with the same fraction of expanding agent and expansion conditions, increases with an increase in the fluidity and therefore with an increase in the DTg.

It is known that the fluidity of the polymeric composition, object of the present patent application, increases together with the expansion process rate also decreasing the weight average molecular weight (Mw) of (i). According to the present invention molecular weight distributions corresponding to a molecular weight at the maximum peak (Mp) ranging from 130 kDa to 190 kDa are suitable for having a good pre-expansion rate and stability of the expanded end-product obtained at the end of the expansion process. Polymeric compositions with Mp values lower than 130 kDa are in fact too fluid and together with DTg values higher than 1° C. lead to a collapsing of the beads during the pre-expansion process. Polymeric compositions with Mp values higher than 190 kDa give an insufficient expansion rate, even if in the presence of a contemporaneous lowering of the Tg, and a non-convenient final density of the expanded end-product.

To avoid the collapsing of the beads in the pre-expansion process, greatly accelerated by the high fluidity of the polymeric composition, mainly caused by the decrease in the Tg of the composition described and claimed, it has been surprisingly found that it is sufficient to insert a fraction of polymer with a high molecular weight into the polymeric component (i), which is such as to obtain a molecular weight distribution with Mz ranging from 430 kDa to 900 kDa. The Mz increases within the range of 430 kDa to 900 kDa with an increase in the DTg.

The preparation of the polymeric component (i) with a high molecular mass, which is such as to obtain an average Mz within the range of 430 kDa to 900 kDa, can be effected with any process known in the state of the art. The high-molecular-mass component can preferably be obtained by adding to the monomer, or to the mixture of vinyl aromatic monomers, at the beginning of or during the polymerization process, a fraction of one or more types of monomers containing more than one double vinyl bond. In this way, a fraction of polymeric chains with a branched structure is obtained, which contribute to forming the high-molecular-mass fraction required.

Monomers containing more than one double vinyl bond to be used as branching agents in the preparation of the vinyl aromatic polymers (a) and of the copolymers (c) can be butadiene, isoprene, vinylcyclohexene, isomers of divinylbenzene, acrylic or methacrylic esters of diols such as ethyleneglycol-dimethacrylate, butandiol-diacrylate, butandiol-dimethacrylate, hexanediol-diacrylate and hexanediol-dimethacrylate. Quantities of polyvinyl monomer suitable for obtaining the fraction of high molecular masses according to the objectives of the present invention range from 0.005% to 0.070% in moles calculated with respect to the total of the monomeric mixture used in the synthesis of (a) and/or (b).

The expanding agent (ii) used in all the compositions described and claimed in the present text can be present in a quantity ranging from 0.2 to 10 parts by weight, more preferably from 1 part to 10 parts by weight, more preferably from 2 to 6 parts by weight, calculated with respect to 100 parts of polymeric base (i).

Expanding agents capable of being englobed in a polymer can be used. Examples of expanding agents adopted are aliphatic hydrocarbons, Freon, carbon dioxide, alcohols such as ethyl alcohol, water.

The polymeric compositions described and claimed in the present text can comprise, in addition to additives with a plasticizing effect, other agents commonly used for the production of expanded end-products and known in the art as flame-retardants, flame-retardant synergic agents, athermanous additives, dyes, antistatic agents, detaching agents, antioxidants, nucleating agents.

The polymeric compositions described and claimed in the present text can be used for the production of expandable beads and expanded articles with high expansion rates and an excellent stability of the cell structure.

The polymeric compositions described and claimed in the present patent application can be obtained with any polymerization process known in the state of the art, for example aqueous suspension processes, or continuous mass processes. The compositions described and claimed can be obtained, for example, following the process described in WO 2008/141766.

Some illustrative but non-limiting examples of the invention are described hereunder.

During the experimental tests, the following methods and equipment were used for determining the molecular weight distribution and Tg. A GPC (Gel Permeation Chromatography) apparatus was used for determining the molecular weight distribution, consisting of:

a pump-injector module Waters Alliance E2695 equipped with a degasser,
a Waters oven with a pre-column and 4 Phenogel columns (Phenomenex) dimensions 300×7.8 mm, particle size 5μ, porosity 106 Å, 105 Å, 104 Å, 103 Å,
a refraction index detector RI Waters 410,
a viscosity detector Viscotek T50A calibrated with Viscotek polydispersed standard, with a declared intrinsic viscosity.

The experimental tests were carried out under the experimental conditions indicated hereunder:

Solvent THF;
Temperature of the columns 30° C.;
Flow 1 ml/min;
Internal standard toluene;
Injection volume 200 microlitres The samples (polydispersed) are injected at a concentration of 1 mg/ml. The universal calibration curve is constructed by injecting 20 monodispersed polystyrene standards, with a molecular weight Mp ranging from 2,170 Da to 4,340,000 Da, registering the intrinsic viscosity and elution volume for each molecular weight.

The data acquisition and processing is effected with Empower2 software (Waters) and Omnisec software v.4.6.1 (Viscotek).

The glass transition temperature (Tg) is measured according to the method explained hereunder. The method incorporates the guidelines of Standard ISO 11357 P.1-2.

The DSC (Differential Scanning calorimetry) equipment consisted of:

a differential scanning calorimeter DSC Q1000 TA Instruments interfaced with a PC and managed with TA Universal Analysis software,
a refrigerated cooling system RCS90 TA instruments,
a standard disposable aluminium pan and lid,
nitrogen atmosphere,
temperature calibration with a certified Indium standard (TA instruments) at a scanning rate of 20° C./min.

In order to prepare the sample, about 2-3 mg of sample are weighed in a disposable aluminium pan. Three complete analyses are effected for each sample according to the process illustrated hereunder, introducing an empty sample-holder into the reference cell.

The sample is equilibrated at 10° C., heated to 200° C. with a scanning rate equal to 20° C./min (first temperature rise), then cooled to 0° C. with a scanning rate equal to 20° C./min, an isotherm is maintained at 10° C. for 2 minutes, the sample is then heated to 200° C. with a scanning rate equal to 20° C./min (second temperature rise).

The thermogram of the second temperature rise is integrated with TA Universal Analysis software and calculation of the Tg, Tonset and DCP.

Comparative Example 1

Preparation of the Polymeric Base and Reference Polymer According to an Aqueous Suspension Process In this example, a polymer is prepared that is subsequently used as polymeric base for preparing the expandable polymeric compositions.

A mixture comprising: 98 parts of styrene, 2 parts of n-butyl acrylate for a total of 27 kg, 0.090 parts of tert-dodecyl mercaptan (t-DM), whose function is to regulate the molecular weight of the copolymer; 0.63 parts of dicumyl peroxide, 0.73 parts of tert-butylperoxy-2-ethylhexylcarbonate (peroxides are radical polymerization initiators) and 0.1 parts of sodium chloride (salt which increases the ionic strength of the water and helps the separation of the monomers from the water) was added, at a temperature of 70° C., in a 100 litre autoclave equipped with a Pfaudler 3-blade stirrer, functioning at 220 rpm, and with breakwaters, containing 122 parts of water, equal to 33 kg. The mixture was heated from a temperature of 70° C. to a temperature of 90° C. in 40 minutes. The mixture was then brought to a temperature of 113° C. in 45 minutes and remained at this temperature for 1 hour and 20 minutes. A second dose of t-DM equal to 0.050 parts and 0.084 parts of a suspending agent (0.056 parts of Ethapol 1000 and 0.028 parts of sodium naphthalene sulfonate, additives that decrease the specific interfacial tension in aqueous suspension processes), was subsequently introduced. At the end of the addition, the mixture was brought from a temperature of 113° C. to a temperature of 123° C. in 20 minutes and remained at this temperature for 3 hours, when the third dose of t-DM equal to 0.040 parts was added. The mixture was subsequently brought to a temperature of 133° C. in 20 minutes and remained at this temperature for about 1 hour, the mixture was then heated to a temperature of 153° C. in 40 minutes and remained at this temperature for a further 2 hours and 35 minutes. The mixture was then cooled, discharged and sieved to recover the fraction of beads produced having dimensions ranging from 0.9 to 1.6 mm.

The reference vinyl aromatic polymer, with respect to which the DTg is to be measured, is prepared following the same procedure described in this example and using the same components in the same quantities (Comparative example 1), but adding, at 70° C., 100 parts of styrene instead of 98 parts of styrene and 2 parts of n-butyl acrylate, and measuring the same MWD within the experimental error of the measurement method. The temperature difference DTg is equal to 3.1° C., the Mp is equal to 152 kDa and the Mz is equal to 256 kDa and is therefore outside the range described and claimed.

Comparative Example 2

Preparation of the Polymeric Base and Reference Polymer According to a Polymerization Process in Aqueous Suspension In this example, a polymer is prepared that is subsequently used as polymeric base for preparing the expandable polymeric compositions.

A mixture composed of: 100 parts of styrene, equal to 27 kg; 0.060 parts of t-DM, 0.063 parts of dicumyl peroxide, 0.073 parts of tert-butylperoxy-2-ethylhexylcarbonate, 0.1 parts of sodium chloride and 2 parts of Marcol 82 oil, was added, at a temperature of 70° C., in an autoclave such as that used in Comparative Example 1, with a stirrer functioning at 220 rpm, and containing 122 parts of water, equal to 33 kg. The mixture was heated, under stirring, bringing the temperature from 70° C. to 90° C. in 30 minutes; this temperature was maintained for 40 minutes. The temperature was then increased again from 90° C. to 113° C. in 45 minutes, and maintained at 113° C. for 1 hour and minutes. A dose equal to 0.033 parts of t-DM and 0.084 parts of a suspending agent (0.056 parts of Ethapol 1000 and 0.028 parts of sodium naphthalene sulfonate) was then added. The mixture was subsequently brought from a temperature of 113° C. to a temperature of 123° C. in 20 minutes, and this temperature was maintained for 3 hours at 123° C. At the end of this period, the third dose of t-DM equal to 0.027 parts of t-DM, was added. The mixture was then brought from a temperature of 123° C. to a temperature of 133° C. in 20 minutes, and was maintained at 133° C. for 1 hour. The mixture was subsequently brought from a temperature of 133° C. to a temperature of 153° C. in 40 minutes, and was maintained at this temperature for 2 hours and 35 minutes. The mixture was then cooled, discharged and sieved to recover the fraction of beads produced having dimensions ranging from 0.9 to 1.6 mm.

The reference vinyl aromatic polymer, with respect to which the DTg is to be measured, was prepared following the same procedure described in this example (Comparative example 2), adding, at 70° C., the same components except for Marcol 82 oil, obtaining the same MWD within the experimental error of the measurement method.

The temperature difference DTg is equal to 4.1° C., the Mp is equal to 186 kDa and the Mz is equal to 318 kDa and does not fall within the range described and claimed.

Comparative Example 3

Preparation of the Polymeric Base and Reference Polymer According to an Aqueous Suspension Process In this example, a polymer is prepared that is subsequently used as polymeric base for preparing the expandable polymeric compositions.

A mixture composed of: 100 parts of styrene, equal to 27 kg; 0.075 parts of t-DM, 0.012 parts of divinyl benzene (DVB), 0.063 parts of dicumylperoxide, 0.073 parts of tert-butylperoxy-2-ethylhexylcarbonate and 0.1 parts of sodium chloride, was added, at a temperature of 70° C., in an autoclave such as that used in Comparative Example 1, with a stirrer functioning at 220 rpm, and containing 122 parts of water, equal to 33 kg.

Repeating the same thermal profile as Comparative example 2, with the same dosage of suspending agent, the second dose of t-DM was equal to 0.042 parts and the third dose of t-DM was equal to 0.033 parts. The mixture, after cooling, at the end of the thermal cycle, was discharged and sieved to recover the fraction of beads produced having dimensions ranging from 0.9 to 1.6 mm.

In this case, the reference vinyl aromatic polymer is the polymer prepared in this example (Comparative example 3).

The temperature difference DTg is 0° C. and does not fall within the range described and claimed, the Mp is equal to 165 kDa, the Mz is equal to 492 kDa.

Comparative Example 4

Preparation of the Polymeric Base and Reference Polymer According to an Aqueous Suspension Process In this example, a polymer is prepared that is subsequently used as polymeric base for preparing the expandable polymeric compositions.

A mixture composed of: 100 parts of styrene, equal to 27 kg; 0.075 parts of t-DM, 0.063 parts of dicumylperoxide and 0.073 parts of tert-butylperoxy-2-ethylhexylcarbonate and 0.1 parts of sodium chloride, was added, at a temperature of 70° C., in an autoclave such as that used in Comparative Example 1, with a stirrer functioning at 220 rpm, and containing 122 parts of water.

Repeating the same thermal profile as Comparative example 2, with the same dosage of suspending agent, and t-DM for the second and third dose as in Comparative example 3, the mixture, after cooling, at the end of the thermal cycle, was discharged and sieved to recover the fraction of beads produced having dimensions ranging from 0.9 to 1.6 mm.

In this case, the reference vinyl aromatic polymer is the polymer prepared in this example (Comparative example 4).

The temperature difference DTg equal to 0° C., the Mp is equal to 174 kDa, the Mz is equal to 316 kDa. In this example the DTg and Mz do not fall within the ranges described and claimed.

Invention Example 1

Preparation of the Polymeric Base and Reference Polymer According to an Aqueous Suspension Process In this example, a polymer is prepared that is subsequently used as polymeric base for preparing the expandable polymeric compositions according to the present invention.

A mixture composed of: 98 parts of styrene, 2 parts of n-butyl acrylate, for a total of 100 parts by weight and equal to 27 kg; 0.012 parts of divinyl benzene (DVB), 0.075 parts of t-DM, 0.063 parts of dicumylperoxide and 0.073 parts of tert-butylperoxy-2-ethylhexylcarbonate and 0.1 parts of sodium chloride, was added, at a temperature of 70° C., in an autoclave such as that used in Comparative Example 1, with a stirrer functioning at 220 rpm, and containing 122 parts of water.

Repeating the same thermal profile as Comparative example 2, with the same dosage of suspending agent and t-DM for the second and third dose as in Comparative example 3, the mixture, after cooling, at the end of the thermal cycle, was discharged and sieved to recover the fraction of beads produced having dimensions ranging from 0.9 to 1.6 mm.

The reference vinyl aromatic polymer, with respect to which the DTg is to be measured, was prepared with the same procedure used in this example, adding, at 70° C., 100 parts of styrene instead of 98 parts of styrene and 2 parts of n-butyl acrylate, obtaining the same MWD within the experimental error of the measurement method. The temperature difference DTg is equal to 3.3° C., the Mp is equal to 172 kDa, the Mz is equal to 506 kDa and falls within the ranges described and claimed.

Invention Example 2

Preparation of the Polymeric Base and Reference Polymer According to an Aqueous Suspension Process In this example, a polymer is prepared that is subsequently used as polymeric base for preparing the expandable polymeric compositions.

A mixture composed of: 98 parts of styrene and 2 parts of ethylhexylacrylate, for a total of 100 parts by weight and equal to 27 kg; 0.012 parts of divinyl benzene (DVB), 0.075 parts of t-DM, 0.063 parts of dicumylperoxide and 0.073 parts of tert-butylperoxy-2-ethylhexylcarbonate and 0.1 parts of sodium chloride, was added, at a temperature of 70° C., in an autoclave such as that used in Example 1, with a stirrer functioning at 220 rpm, and containing 122 parts of water.

Repeating the same thermal profile as Comparative example 2, with the same dosage of suspending agent and t-DM for the second and third dose as in Comparative example 3, the mixture, after cooling, at the end of the thermal cycle, was discharged and sieved to recover the fraction of beads produced having dimensions ranging from 0.9 to 1.6 mm.

The reference vinyl aromatic polymer, with respect to which the DTg is to be measured, was prepared with the same procedure indicated in this example (invention example 2), adding, at 70° C., 100 parts of styrene instead of 98 parts of styrene and 2 parts of ethylhexylacrylate, obtaining the same MWD within the experimental error of the measurement method.

The temperature difference DTg is equal to 3.6° C., the Mp is equal to 172 kDa, the Mz is equal to 516 kDa. In this example, the DTg, Mp and Mz and fall within the ranges described and claimed.

Example 3.1

Preparation of a Polymeric Base

In this example, a polymer is prepared that is subsequently used as polymeric base for preparing the expandable polymeric compositions.

A mixture consisting of 94 parts of styrene, 6 parts of ethyl benzene, 0.0280 parts of divinyl benzene and 0.095 parts of chain-transfer agent t-DM is fed in continuous, at a flow-rate of 4 kg/hour, into a plant consisting of a feeding tank, two vertical PFR reactors in series, equipped with a jacket and thermostating coils, with a stirrer along the vertical axis having blades perpendicular to the axis and free to rotate between the thermostating tubes, having two thermostating areas each with a free reaction volume of 6.7 litres. The mixture preheated in a tank to a temperature of 40° C., is fed by means of a piston pump from the bottom of the first vertical PFR reactor, in which it is thermostat-regulated at temperatures of 134° C. in the first area and 145° C. in the second thermostating area, with stirring at 55 rpm. The reaction mixture leaving the head of the first PFR is fed with a gear pump to the bottom of the second vertical PFR and is thermostat-regulated at temperatures of 150° C. in the first area and 155° C. in the second thermostating area, with stirring at 20 rpm. The reaction mixture leaving the head of the second PFR, with a fraction of polymer equal to about 75%, is fed by means of a gear pump to a thermostating oil exchanger at 250° C. and then to a jacketed vacuum tank, thermostat-regulated at 230° C., with a residual pressure of 12 mbar. The fraction of non-polymerized reaction mixture is evaporated and the polymer leaving the bottom of the vacuum tank is sent by means of a gear pump to the granulator.

Table 1 indicates the averages of the MWD and Melt Flow Rate (MFR 200° C./5 kg) of the polymeric base obtained.

TABLE 1

|  | Mn [kDa] | Mw [kDa] | Mw/Mn | Mz [kDa] | Mp [kDa] | MFR [g/10'] |
|---|---|---|---|---|---|---|
| Ex. 3.1 | 64 | 194 | 2.9 | 445 | 135 | 17 |

Example 3.2

Preparation of a Polymeric Base

In this example, a polymer is prepared that is subsequently used as polymeric base for preparing the expandable polymeric compositions.

A mixture consisting of 94 parts of styrene, 6 parts of ethylbenzene, 0.02 parts of divinylbenzene (DVB) and 0.025 parts of chain-transfer agent t-DM was fed to the same plant and operating under the same conditions as Example 3.1.

Table 2 indicates the averages of the MWD and MFR (200° C./5 kg) of the polymeric base obtained.

TABLE 2

|  | Mn [kDa] | Mw [kDa] | Mw/Mn | Mz [kDa] | Mp [kDa] | MFR [g/10'] |
|---|---|---|---|---|---|---|
| Ex. 3.2 | 90 | 289 | 3.19 | 654 | 178 | 4.8 |

Example 4

Preparation of Expandable Compositions with the Bases of Comparative Examples 1-4 and Invention Examples 1-2

The expanding agent, a mixture of n-pentane and iso-pentane, are added to the beads produced with Comparative examples 1-4 and invention Examples 1-2, in suspension in an autoclave, so as to obtain expandable beads containing 5% of pentanes.

The tests were carried out in a 6.2 litre autoclave equipped with a Pfaudler three-blade stirrer functioning at 350 rpm and containing 562 parts of water. 100 parts of beads as prepared in Comparative examples 1-4 and in invention Examples 1-2 are charged into the autoclave, one at a time, with dimensions ranging from 0.9 and 1.6 mm, together with 2.6 parts of tricalcium phosphate and 0.004 parts of sodium dodecyl benzene sulfonate and 6.6 parts of a mixture of expanding agents composed of n-pentane and iso-pentane in which the n-pentane/iso-pentane ratio=2.7.

The mixtures obtained are heated until the temperature of 70° C. and remain at this temperature for 2 hours and 30 minutes. The mixtures are then heated from a temperature of 70° C. to a temperature of 115° C. in 60 minutes. The mixtures remain under these conditions for 1 hour and 30 minutes. The mixtures are then cooled from 115° C. to 60° C. in 60 minutes and from 60° C. to 30° C. in 30 minutes. The mixtures thus processed are discharged and separated from the water, recovering the beads that are subsequently dried and subjected to a further treatment as follows: 0.1 parts of zinc stearate and 0.1 parts of a mixture consisting of mono-, di- and tri-esters of glycerine are added to the beads.

The beads are expanded in a batch expander in a stream of steam at a constant temperature.

Tables 3a and 3b indicate the molecular weights obtained, the DTg values of the compositions not containing the expanding agent (consisting of the mixture of pentanes) and the density reached by the beads at different expansion times at a temperature of 101.5° C. for the various compositions.

TABLE 3a

| Polymeric base | Mn [kDa] | Mw [kDa] | Mw/Mn | Mz [kDa] | Mp [kDa] | DTg [° C.] |
|---|---|---|---|---|---|---|
| Comparative 1 | 63 | 152 | 2.41 | 256 | 152 | 3.1 |
| Comparative 2 | 78 | 190 | 2.44 | 318 | 186 | 4.1 |
| Comparative 3 | 72 | 203 | 2.82 | 492 | 165 | 0 |
| Comparative 4 | 74 | 184 | 2.49 | 316 | 174 | 0 |
| Inv. Example 1 | 71 | 209 | 2.94 | 506 | 172 | 3.3 |
| Inv. Example 2 | 72 | 211 | 2.9 | 516 | 172 | 3.6 |

TABLE 3b

| | Density (g/l) | | | |
|---|---|---|---|---|
| Polymeric base | 1' | 2' | 3' | 5' |
| Comparative 1 | 13.9 | 14.3 | 14.0 | 17.0 |
| Comparative 2 | 21.0 | 19.2 | 17.3 | 16.7 |
| Comparative 3 | 31.0 | 26.0 | 21.6 | 19.0 |
| Comparative 4 | 27.3 | 22.1 | 19.0 | 17.7 |
| Inv. Example 1 | 18.3 | 17.7 | 16.1 | 15.7 |
| Inv. Example 2 | 19.2 | 17.8 | 16.4 | 16.4 |

From Table 3a, it can be observed that invention Examples 1 and 2, in addition to the acrylic comonomer fration, have Mz, Mp and DTg values that all fall within the ranges claimed, whereas Comparative Examples 1-4 have Mz or DTg values that do not fall within the ranges claimed.

In Table 3b, invention examples 1-2 obtain both low densities at 1' of pre-expansion time, and also progressively lower densities up to 5' (stability of the final structure). Comparative Example 1 has a low density at 1', but an increasing density from 2' to 5' (collapse of the structure). Comparative Example 2 produces high densities at 1' (low expansion rate). Comparative Examples 3 and 4 have high densities both at 1' and at 5' (low expansion rate).

Invention Example 5

Preparation of Expandable Compositions with the Bases of Examples 3.1 and 3.2 and Comparison with the Expandable Composition Obtained from GPPS of Industrial Production Having a MWD with Mz that does not Fall within the Ranges of the Invention The polymeric bases of Examples 3.1 and 3.2 were mixed according to a ratio of 1:3, in an extruder at a temperature of 190° C.

An extruded sample was taken from this mixture as reference vinyl aromatic polymer for determining its Tg. 5.5 parts of carbon coke, 4 parts of flame-retardant 1,1'-(isopropylidene)bis[3,5-dibromo-4-(2,3di bromopropoxy)benzene], 0.22 parts of 2,3-dimethyl-2,3-diphenylbutane, 0.1 parts of calcium hydroxide were added to the resulting polymeric stream.

A sample of this mixture was taken as polymeric composition without the expanding agent to determine its Tg. Finally, 5 parts of a mixture of iso-pentane and n-pentane were added. The molten polymeric mixture was granulated and cooled to obtain expandable beads having dimensions ranging from 0.9 to 1.6 mm.

The following data were obtained for the sampled polymers without expanding agent: the DTg difference is equal to 8.0° C., the Mp is equal to 165 kDa, the Mz is equal to 610 kDa.

Comparative Example 5

This example starts from the polymeric base Edistir N1782, polystyrene. An extruded sample was taken from this polystyrene to determine its Tg as reference vinyl aromatic polymer.

The polymeric base Edistir N1782, was mixed, in an extruder, at a temperature of 190° C., with 5.5 parts of carbon coke, 4 parts of flame-retardant hexabromocyclododecane, 0.22 parts of 2,3-dimethyl-2,3-diphenylbutane, 0.1 parts of calcium hydroxide. A sample of this mixture was taken as polymeric composition without the expanding agent, to determine its Tg.

5 parts of a mixture of iso-pentane and n-pentane were then added. The molten polymeric mixture was granulated and cooled to obtain expandable beads having dimensions ranging from 0.9 to 1.6 mm.

The following data were obtained for the polymers without expanding agent: DTg=4.1° C., Mp=183 kDa, Mz=320 kDa.

The following formulation was added to the surface of the expandable beads obtained in the invention Example 5 and Comparative Example 5: 0.1 parts of glycerine ester, 0.05 parts of a mixture of mono-, di-e tri-ester of glycerine, 0.1 parts of tri-ester of glycerine, 0.05 parts of zinc stearate, 0.1 parts of Ethylene-bistearamide and 300 ppm of a Poliethylene glycol sorbitan mono-oleate oil. The beads were expanded in a batch expander in a stream of steam at a constant temperature.

Tables 4a and 4b indicate the molecular weight distributions, the DTg values of the materials not containing pentane and the minimum density reached at the various expansion times at a T of 101.5° C.

TABLE 4a

|  | Mn [kDa] | Mw [kDa] | Mw/Mn | Mz [kDa] | Mp [kDa] | DTg [° C.] |
|---|---|---|---|---|---|---|
| Inv. Example 5 | 80 | 260 | 3.25 | 610 | 164 | 8.0 |
| Comp. Example 5 | 80 | 197 | 2.46 | 320 | 183 | 4.1 |

TABLE 4b

| Density reached (g/l) at the various expansion minutes at a T of 101.5° C. | | | | |
|---|---|---|---|---|
|  | 1' | 2' | 3' | 5' |
| Inv. Example 5 | 17.6 | 15.8 | 15.4 | 15.0 |
| Comp. Example 5 | 19.0 | 16.6 | 17.0 | 17.6 |

In Table 4a, invention example 5 has all the components (i) and (iii) and Mp, Mz and DTg that fall within the ranges of the invention, whereas the Mz of Comparative Example 5 does not fall within the ranges of the invention.

In Table 4b, the behaviour of invention example 5 in expansion has a low density at 1' (optimum expansion rate) and a progressively decreasing density up to 5' (optimum stability of the cell structure), whereas Comparative Example 5 has increasing densities from 2' to 5' (collapse of the cell structure).

The invention claimed is:

1. An expandable polymeric composition in bead form, comprising:
    i. a polymeric base comprising:
        a) from 0% to 100% by weight based on the total base (i) of a vinyl aromatic polymer,
        b) from 100% to 0% by weight based on the total base (i) of a co-polymer comprising from 50% to 99% by weight of a vinyl aromatic monomer and from 1% to 50% by weight of an alkyl ester having from 1 to 18 carbon atoms derived from acrylic or methacrylic acid,
    wherein the polymeric base comprises at least 2% by weight of b) or the polymeric base comprises only (a);
    ii. from 0.2 to 10 parts by weight based on 100 parts of the polymeric base (i) of an expanding agent, and
    iii. alternatively:
    A) from 0 to 10 parts by weight based on 100 parts of the polymeric base (i) of an additive with a plasticizer effect when (i) comprises at least 2% by weight of (b), or
    B) from 0.3 to 10 parts by weight based on 100 parts of the polymeric base (i) of an additive with a plasticizer effect when (i) comprises only (a),
    wherein:
    the molecular weight at a peak maximum Mp of (i) is from 130 kDa to 190 kDa and a centrifuge average molecular weight Mz of (i) is from 430 kDa to 900 kDa,
    the difference in a glass-transition temperature (DTg) measured from a vinyl aromatic polymer having a molecular weight distribution (MWD) of (i) and a composition of a sole vinyl aromatic fraction of (i), and a polymeric composition consisting of (i) and (iii), is from 1° C. to 8° C.,
    wherein the molecular weights and molecular weight distribution is determined by size exclusion chromatography.

2. The polymeric composition of claim 1, wherein Mp of (i) ranges from 140 kDa to 190 kDa.

3. The polymeric composition of claim 1, wherein Mp of (i) ranges from 140 kDa to 180 kDa.

4. The polymeric composition of claim 1, wherein Mz of component (i) ranges from 440 kDa to 900 kDa.

5. The polymeric composition of claim 1, wherein Mz of component (i) ranges from 440 kDa to 700 kDa.

6. The polymeric composition of claim 1, wherein Mp of (i) ranges from 140 kDa to 180 kDa and Mz of (i) is from 440 kDa to 700 kDa.

7. The polymeric composition of claim 1, wherein DTg ranges from 3° C. to 8° C.

8. The polymeric composition of claim 1, wherein the polymeric base (i) comprises a vinyl aromatic copolymer (b) comprising from 1% to 6% of the alkyl ester having from 1 to 18 carbon atoms and derived from acrylic or methacrylic acid, and comprising from 94% to 99% of a vinyl aromatic monomer.

9. The polymeric composition of claim 1, wherein the polymeric base (i) comprises:
   a) from 80% to 98% by weight based on the total base (i) of the vinyl aromatic polymer,
   b) from 20% to 2% by weight based on the total base (i) of a co-polymer comprising from 50% to 70% by weight of a vinyl aromatic monomer and from 30% to 50% by weight of an alkyl ester having from 1 to 18 carbon atoms derived from acrylic or methacrylic acid.

10. The polymeric composition of claim 1, wherein the co-polymer (b) is present and is at least one selected from the group consisting of styrene-ethyl acrylate, styrene-methyl methacrylate, styrene-butyl acrylate, styrene-2-ethylhexyl acrylate, styrene dodecyl acrylate, styrene dodecyl methacrylate, styrene-stearyl acrylate, styrene-stearyl methacrylate, and styrene-glycidyl methacrylate.

11. The polymeric composition of claim 1, wherein the additive with plasticizer effect is at least one selected from the group consisting of a linear or cyclic oligomer obtained by polymerization of a vinyl aromatic monomer; a saturated hydrocarbon; a mixture of paraffins with a boiling temperature higher than 70° C.; and a halogenated flame retardant additive comprising phosphorus, sulfur, or both.

12. The composition of claim 1, wherein the additive with plasticizer effect is at least one flame retardant selected from the group consisting of hexabromocyclododecane, pentabromide monochloro cyclo-exane, pentabromophenyl allil ether, a brominated styrene-butadiene copolymer, tetrabrotnobisphenol A bis-dibromopropyl ether, and triphenyl phostate.

13. The polymeric composition of claim 1, wherein an acrylic monomer of the co-polymer (b) is an acrylic ester having from to 18 carbon atoms derived from acrylic acid, methacrylic acid, or from a mixture thereof.

14. The polymeric composition of claim 1, wherein an acrylic monomer of the co-polymer (b) is selected from the group consisting of ethyl acrylate, methyl methacrylate, butyl acrylate, 2-ethylhexyl acrylate, dodecyl acrylate, dodecyl methacrylate, stearyl acrylate, stearyl methacrylate, and glycidyl methacrylate.

\* \* \* \* \*